United States Patent [19]
Wiklund et al.

[11] Patent Number: 5,313,409
[45] Date of Patent: May 17, 1994

[54] ARRANGEMENT FOR PERFORMING POSITION DETERMINATION

[75] Inventors: Rudolf Wiklund, Täby; Mikael Herztman, Sollentuna; Leif Andersson, Täby; Olle Engdahl, Enebyberg; Lars Ericsson, Täby, all of Sweden

[73] Assignee: Geotronics, Danderyd, Sweden

[21] Appl. No.: 768,668

[22] PCT Filed: Apr. 6, 1990

[86] PCT No.: PCT/SE90/00233
§ 371 Date: Oct. 4, 1991
§ 102(e) Date: Oct. 4, 1991

[87] PCT Pub. No.: WO90/12284
PCT Pub. Date: Oct. 18, 1990

[30] Foreign Application Priority Data
Apr. 6, 1989 [SE] Sweden .................... 8901221-5

[51] Int. Cl.⁵ .................................... G01N 21/01
[52] U.S. Cl. .................... 364/556; 364/505; 364/516; 364/561; 33/290; 33/291; 33/293; 33/294; 356/152
[58] Field of Search .................... 33/290–296; 318/580, 587; 364/561, 505, 556, 516; 356/5, 141, 152

[56] References Cited

U.S. PATENT DOCUMENTS

| | | | |
|---|---|---|---|
| 3,865,491 | 2/1975 | Hogan | 356/152 |
| 4,030,832 | 6/1977 | Rando et al. | 33/294 |
| 4,171,907 | 10/1979 | Hill et al. | 356/5 |
| 4,441,812 | 4/1984 | Feist | 356/147 |
| 4,673,287 | 6/1987 | Rickus | 33/294 |
| 4,681,433 | 7/1987 | Aeschlimann | 356/5 |
| 4,712,915 | 12/1987 | Kosakowski et al. | 356/152 |
| 4,820,041 | 4/1989 | Davidson et al. | 356/141 |
| 5,051,934 | 9/1991 | Wiklund | 364/561 |

FOREIGN PATENT DOCUMENTS
WO89/06783 7/1989 World Int. Prop. O.

Primary Examiner—Jack B. Harvey
Assistant Examiner—Hal D. Wachsman
Attorney, Agent, or Firm—Pollock, Vande Sande & Priddy

[57] ABSTRACT

An arrangement for one-man surveying, including a measuring station (1) and a target unit (2). A sighting-marker arrangement is provided which can be indicated by an indicator arrangement (7) on the measuring station. The measuring station (1) automatically takes a target seeking mode when the indicator arrangement (7) does not indicate the sighting-marker arrangement and a target following mode, when the indicator arrangement indicates the sighting-marker arrangement. The sighting-marker arrangement includes a combination of a first and a second sighting-marker unit. The first unit has a light source (8) on the target unit (2). The second unit has a light source (9) on the measuring station (1) and a reflector (11) on the target unit (2).

13 Claims, 4 Drawing Sheets

ARRANGEMENT FOR PERFORMING POSITION DETERMINATION

FIELD OF THE INVENTION

The present invention relates to an arrangement for performing position-determining and/or setting-out work for one-man surveying.

BACKGROUND OF THE INVENTION

It is known within geodetic surveying, or geodesy, to measure distances and angles by using electrooptical methods to determine the positions of measuring points in a relevant coordinate system. In one conventional method, an electrooptical distance measuring instrument (EDM) transmits a modulated light beam of infrared light, which is reflected from a prism of cubical configuration placed on the target point for the purpose of taking measurements. The light reflected by the prism is received and phase-detected, thereby enabling the distance to be determined with great accuracy. The vertical angle and horizontal direction to the target point can also be determined electrically or electrooptically. It is known to permit the measuring instrument to take repeated measurements and to continuously determine the position of a moving target, where the measuring instrument is directed onto the target manually.

It is also known for a measuring instrument to track or follow a target automatically with the aid of a servo drive controlled by a signal transmitted from or reflected by the target.

SUMMARY OF THE INVENTION

It is an object of the present invention to provide a simple and reliable arrangement to make the measuring instrument find alignment with a target point and rapidly and reliably track the target point irrespective of whether the target point is close to or far from the measuring instrument.

Another object of the present invention is to provide an arrangement which, during a target searching mode, can discriminate against to lock the measuring instrument to a false target.

Still another object of the present invention is to provide an arrangement which could be locked to the target during a target following mode even though the target is moving.

Thus, the invention relates to an arrangement which enables the instrument to seek the target point, and subsequent to being summoned, lock onto the target and track any further movement thereof. The measuring instrument is preferably based on an existing, so-called total station, e.g., a station having the registered trademark Geodimeter(R), which measures distances and angles in accordance with the foregoing. The station-setting arrangement is constructed so that the whole of the measuring procedure, including alignment of the instrument, initiation of the measuring process, data storage and computation can be readily carried out automatically and the setting-out work can be done by one single person operating with a unit placed on the target point. To date, it has been necessary to carry out measuring procedures with a person responsible for managing the measuring instrument and data registration, and a person responsible for placing a reflector unit on the measuring point. The arrangement of the measuring instrument and target point is controlled from the actual target point itself, where important information is found and where decisions are taken during the measuring procedure.

BRIEF DESCRIPTION OF THE DRAWINGS

The invention will now be described in more detail with reference to the accompanying drawings, in which.

DESCRIPTION OF PREFERRED EMBODIMENTS

Figure 1:
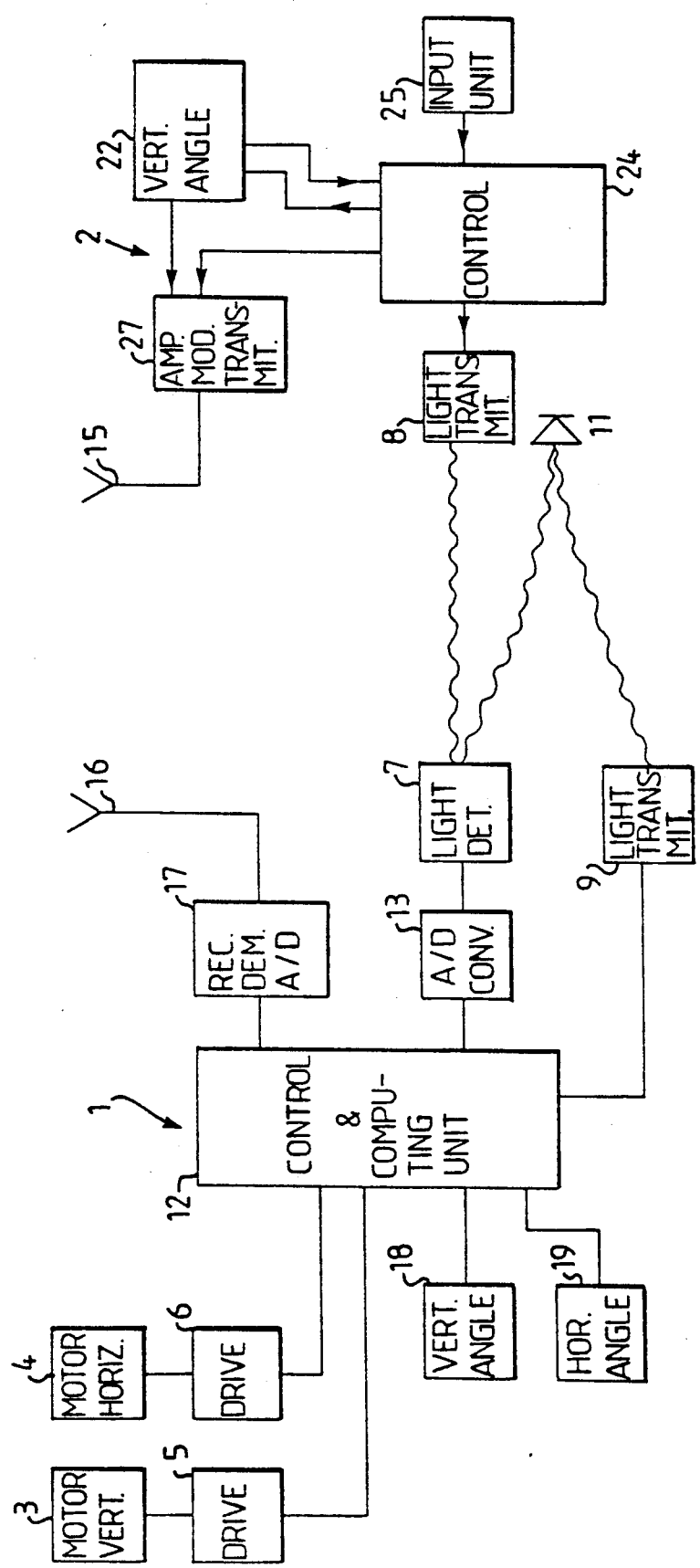
FIG. 1 is a block diagram of one embodiment of the control arrangement forming part of the present invention.
Figure 3:
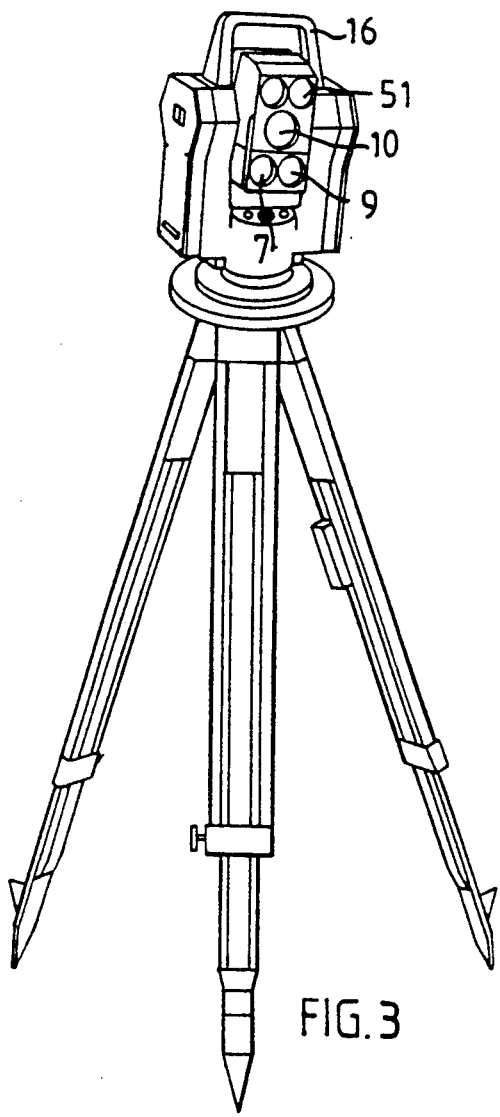
FIG. 3 is a perspective view of one embodiment of a measuring station.

The invention includes a measuring-instrument unit 1 and a target unit 2. Only the arrangement for aligning the instrument towards the target unit is shown in FIG. 1 and thus not the instrument part itself which for instance could be an EDM-meter having vertical and horizontal angular meters. As evident from the block diagram in FIG. 1, the measuring instrument unit is provided with two servomotors 3 and 4 each having an individual drive 5 and 6 for rotation in the vertical and horizontal direction, respectively. The instrument unit also includes a detector unit 7 which is constructed to recognize and determine the position of a signal transmitted from a light transmitter 8 mounted on the target unit. The detector unit 7 is also constructed to recognize a light signal transmitted from a light transmitter 9 placed on the measuring-instrument unit, this light being reflected on a reflector 11 placed on the target unit. A control unit 12 on the measuring-instrument unit 1 is coupled to the light detector 7, via a converter unit 13, and obtains signals suitable for evaluating alignment of the measuring unit with the target, these signals and the construction of the detector being described in more detail hereinbelow. Each of the target unit 2 and the measuring-instrument unit 1 is provided with a respective antenna 15 and 16 and communication unit 27 and 17. The reference 10 in FIG. 3 identifies a telescope for use in manually aligning the measuring-instrument unit 1 with the target unit when manual alignment is desired, and does not therefore constitute a unit which falls within the purview of the actual inventive concept.

The reference 51 identifies an a conventional EDM-device. This distance meter is also directed onto the cube corner prism 11. Therefore, a parallax error regarding the instrument direction is introduced in the system when the target and hence the prism 11 comes to close to the measuring-instrument unit 1. It is, however, possible to provide two different sets of prisms, one (11) for the target seeking and tracking beam and another (50) (see FIG. 2) for the EDM-device, if the target seeking and tracking beam and the EDM-device beam have different wave-lengths and the prisms are provided with wave-length filters adapted to the wavelength of the very light beam they are intended to reflect. However, it is rather expensive to have two such reflection systems on the target unit and the filters will also introduce an attenuation of the reflected light beam. Thus, it is preferred not to have a separate prism arrangement 50 for the EDM-device, but rather to use one and the same prism 11 for both the instrument and the target seeking and tracking device.

The light transmitter 8 and the prism 11 are preferably placed adjacent one another, thereby minimizing parallax at the transition from providing target tracking alignment with the aid of the light transmitter 9, the cube-corner prism 11 and the light detector 7 to alignment with the aid of the light transmitter 8 and the light detector 7 in the manner hereinafter described in more detail.

Instead of using a single detector 7 which functions to indicate both the light arriving from the light transmitter 8 and the light arriving from the light transmitter 9, the detector 7 can be adapted to detect the light from the transmitter 9 and a further detector unit (not shown) can be provided for detecting the light from the light transmitter 8. For instance, the light transmitters 8 and 9 can be constructed to transmit light within mutually different wavelength ranges and the detectors may be provided with light filters adapted to the wavelength ranges of respective transmitters 8 and 9.

Figure 2:
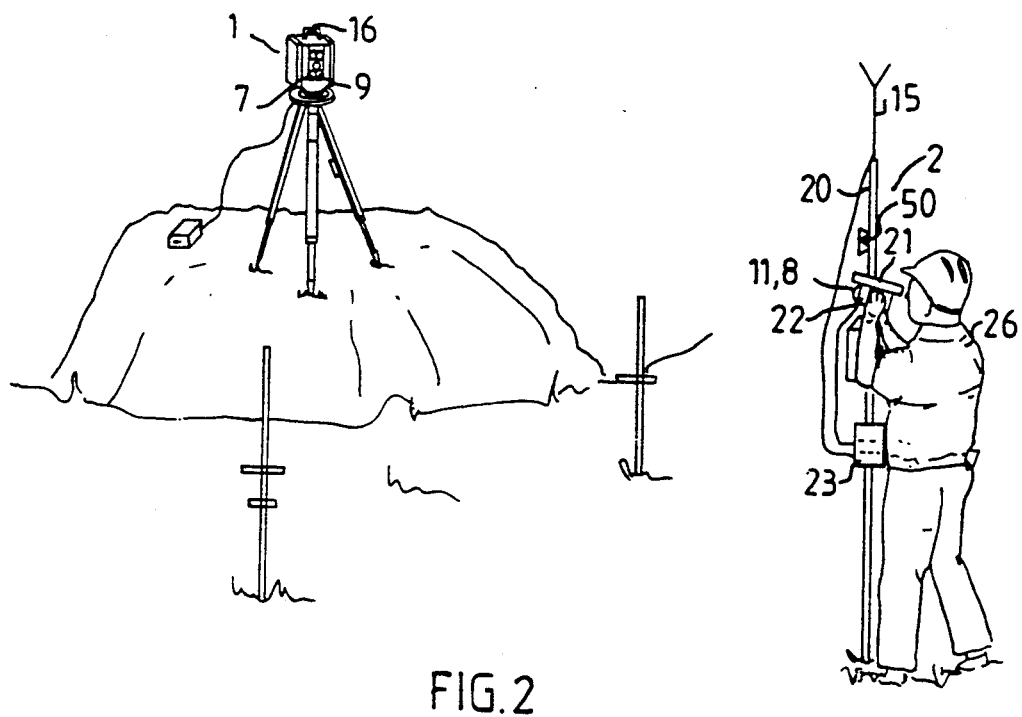
FIG. 2 illustrates a measuring arrangement at work in the open countryside.

In the embodiment illustrated in FIG. 2, the target unit 2 includes a staff 20, provided with the antenna 15, and sighting means which includes a telescope 21 fitted with a vertical-angle indicator 22 of the kind which produces automatically an electrical signal indicative of the angular position of the telescope in relation to the vertical. A vertical-angle indicator of the pendulum type also has this facility. The vertical-angle indicator 22 is connected to a control box 23 which is mounted on the staff and which includes a control unit connected to a keyboard 25 (see FIG. 1) which can be manipulated by an operator 26 positioned by the side of the staff 20. The operator brings the telescope 21 into alignment with the measuring instrument on the measuring-instrument unit and depresses a key either on the sighting means 21, 22 or on the box 23, when he considers that alignment is correct.

Depression of the key causes the control unit to read-off the vertical-angle indicator and to produce a control signal. The digital angle-indicating signal is transmitted to the communication unit 27. This unit may comprise, for instance, a radio unit having circuits for modulating and transmitting angle information, e.g., on radio frequency, and synchronizing and control signals for transmission via the antenna 15. Other types of transmission systems are conceivable, for instance transmission via microwave links.

A communication unit 17 (FIG. 1) for receiving and demodulating the signal arriving from the antenna 16 is connected to the control unit 12. This unit receives the angle information and calculates the vertical angle corresponding to the angular value obtained from the indicator 22 and to which the optical system of the instrument unit shall be aligned prior to receiving a signal from the light transmitter or the reflector 11. This angle will be $\pi$ rod (200 gons) minus the angular value obtained from the indicator 22. The control unit steers the servo motor 3 to the calculated angle, via the drive unit 5, on the basis of the information obtained from the vertical angle indicator 18 (with the digitally produced signal). This setting need only be effected with such accuracy as to ensure that the signal from the light transmitter 8 and the reflector 11 will fall within the aperture angle of the detector 7. The drive unit 6 then causes the servo motor 4 to rotate the instrument horizontally while, at the same time, reading-off a horizontal angle indicator 19 with a digitally produced signal.

In FIG. 2, the light transmitter 8 of the target unit 2 is shown positioned on the sighting unit 21, 22, although said transmitter may equally well be placed directly on the staff 20. The light transmitter 8 may for instance be an IR-diode or a red light diode. The detector 7 in the measuring instrument unit 1 may, in one practical embodiment of the detector, have an optical field of view of one or more degrees. The light transmitter 8 may have a scattering angle of some tens of degrees. These values are only approximate and are fully contingent on the range desired of the system, i.e., on the practical applications for which the system is used.

In order to enable the instrument unit 1 to seek and find the target unit, the unit is thus directed vertically to the angle which corresponds to the angle indicated by the sighting means 21, 22, as described above. In this case, the instrument unit need only be rotated by the servo drive in a plane around its vertical axis, until the detector unit 7 observes the control signal from the light transmitting unit 8 and the reflected signal from the unit 11, whereupon the servo drive in the horizontal direction is stopped. If this rotation is rapid, the instrument unit will pass the target, although the position of the target can be registered by the control unit 12, which first stops and then rotates the instrument unit 1 back onto the target. The control unit 12 then passes to its target tracking mode and controls the servo motors 3 and 4 of the instrument unit 1 in a manner described in more detail hereinbelow, so as to track the target.

Both the signal from the light transmitting unit 8 and the reflected signal from the unit 11 must be detected by the detector 7 during the target seeking sequence in order to discriminate the instrument unit from locking to false targets, as will be discussed in more detail hereinbelow. During the target tracking sequence, when the target is moved in relation to the instrument, and the target tracking normally is based on the signal from the light transmitting unit 8, because the target unit is rather close to the instrument unit, it is essential also to have the reflected signal from the prism 11 detected by the control and computing unit 12, even though it is not used for the actual tracking, because in this case the tracking could instantly be switched over to tracking based on the reflected beam from the prism 11, if the signal from the unit 8 should be lost. The target unit staff could sway when moved. Then, there is a risk that the light transmitting unit could be turned such that its light lobe is moved out of contact with the detector 7. The direction of the reflected light beam from the prism will be kept essentially antiparallel to the light beam from the light transmitter 9 even for rather extensive turning of the staff, at least compared to what can be permitted for the unit 8. However, when actual measurements of measuring points are to be made, i.e. not only measurements made during movement in order to up-date positional values for the control and computing unit 12, the direction of the instrument should preferably be based on the signal from the light transmitting unit 8 onto the detector 7, i.e., if this is available to a sufficient extent.

Figure 4:
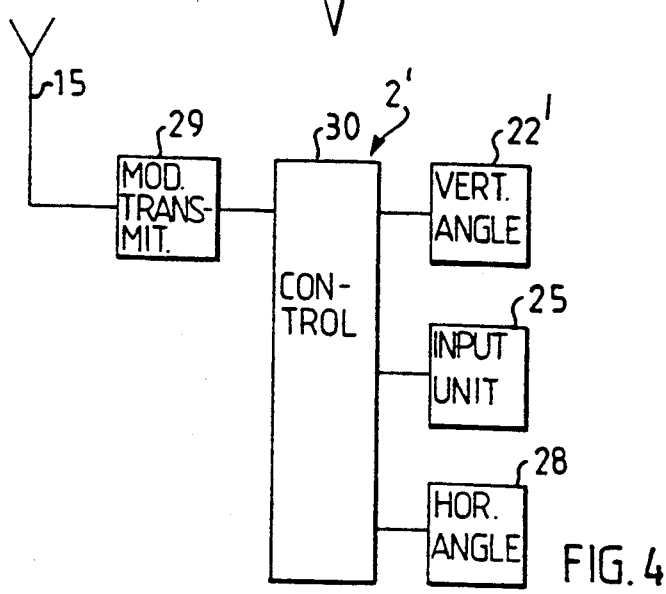
FIG. 4 illustrates another embodiment of part of the arrangement shown in FIG. 1.

As shown in the block diagram of FIG. 4, a further method is one of reducing the search sector, and thus the search time, and providing the sighting means 21, 22 of the target unit with a horizontal-direction indicator 28, for instance an indicator of the digital compass kind. When the sighting means of the target unit are directed onto the instrument unit, the compass will give information relating to the mutual direction relative to the north-direction of the compass. This measuring value is sent to the instrument unit 1 via the communication link 15, 16, as is also the command signal and the vertical-angle signal. In the embodiment illustrated in FIG. 4, the vertical-angle indicator 22', which produces a digital output signal, and the horizontal-direction indicator 28 are connected directly to the control unit 30, which delivers the received values to the antenna 15, via a communication unit 29.

When the light detector 7 has indicated the receipt of a signal from the light transmitter 8 and the reflector 11, the control unit 12 passes to its target tracking mode, i.e., passes to a program loop for servosteering the setting of the optical system of the instrument unit onto the target. Two main applications can be discerned: firstly, the application of measuring and determining the position of the stationary targets, and secondly the application of measuring and determining the position of moving targets. In the first instance, in which the target is stationary, the instrument unit self-locks onto the target unit 2, which is positioned on the point concerned and is levelled, whereafter distance and angles are measured and the position calculated. When taking measurements in respect of moving targets, e.g., when setting-out in construction work or when carrying out hydrographic measurements, the instrument unit 1 tracks the movement of the target unit 2 and delivers the measurement values obtained by repeated distance and angle measuring processes, so that the position relative to the desired position can be calculated by the instrument computer and information can be supplied to the personnel carrying out the setting-out work or to a vehicle, such as a boat, depending on each particular circumstance. Present day measuring equipment is capable of producing about three positional values per second.

In practice, partly contradictory requirements are placed on the aforedescribed system. For instance, the system must be capable of taking both short range and long range measurements. Moderate requirements are also placed on the accuracy with which the measuring instrument is aligned with the target unit, particularly when the target unit is moved while taking measurements. Tracking systems which function under given conditions are known in the art. One such system, which utilizes rotary modulation in the periphery around the intrinsic measuring beam of the instrument, is described in Swedish Patent 8402723-4. Although this system functions satisfactorily, it is relatively expensive for inclusion in equipment intended for setting-out purposes and the like.

In accordance with the present invention, the tracking system is constructed so as to enable measurements to be made accurately while simplifying the work of the operator in the case of both short and long distances. The arrangement is configured with a so-called active system, and with a so-called passive system. By active and passive systems are systems in which the target unit 2 is either active or passive as a transmitter.

The active system includes the light detector 7 which cooperates with the light transmitter 8 which is directed onto the instrument unit 1. Its lobe angle, i.e., its light scattering angle, may, in practice, be for instance ±10 gon, in order to achieve a range of some hundred meters at normal responsiveness and signal/noise ratio for existing detector material. Consequently, the operator needs to align the target unit 2 with the instrument unit 1 to within about ±1.6 rad (±10 gon).

The active system is used advantageously at relatively short distances, since the system can be made parallax-free, since it provides good point definition, i.e., the illuminating point onto which the instrument unit is aligned can be given a small extension.

The light received by the detector unit 7 in the instrument unit 1 is focused on a semiconductor-type detector. This detector has an extended surface, and it is the impingement point of the incident radiation on this surface which is, detected. There is for instance, used a so-called SITEC-detector, the output signal of which provides directly the cartesian coordinates of the impingement point.

Figure 5:
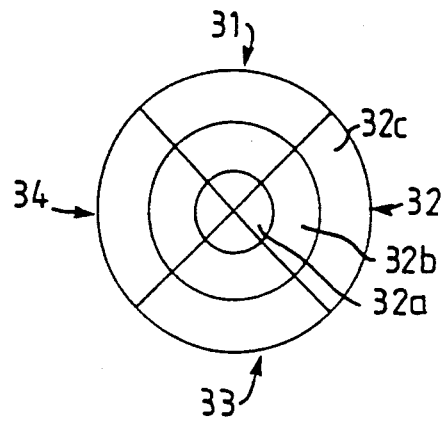
FIG. 5 illustrates a first embodiment of a detector.

Other types of impingement-point location sensitive detectors can be used. Two embodiments of such detectors are illustrated respectively in FIGS. 5 and 6. The detector of the FIG. 5 embodiment is configured with a plurality of segments 31, 32, 33, 34 so as to enable the position of the instrument light to be determined. At least three segments are required for detecting deviations, both lateral and vertical deviations, although it is simpler to use four segments, as illustrated in FIG. 5. Each segment is divided into sectors, e.g., 32a, 32b, 32c in respect of the sector 32, radially outside one another, so that the control unit 12 is able to determine the degree of deviation outwardly. When tracking has been established and the incident light is held centered on the central part of the detector, the outer segments 32c, etc. can be disconnected. An improved signal/noise ratio is then obtained. An error signal is generated as a measurement of the error of alignment of the instrument unit with the target unit, this signal being used by the control unit 12 to servo-steer the instrument unit 1 onto the target unit 2, such that the light signal from the light transmitter 8 will fall as centrally as possible on the light detector 7.

Figure 6:
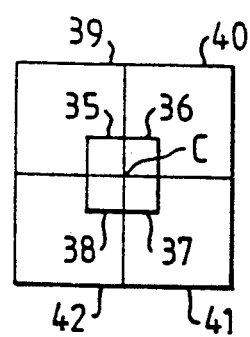
FIG. 6 illustrates a second embodiment of a detector.

In the FIG. 6 embodiment, the detector has a square shape, although it may also have an oblong shape, and includes four, inner detector units 35-38 which are collected around a central point C and are each surrounded externally by a respective outer detector unit 39-42. This type of detector is also operative to servo-steer the control unit 12 in the instrument unit 1 onto the target unit, so that the light signal from the light transmitter 8 will fall as centrally as possible on the detector.

The unit 13 shown in FIG. 1 is configured to detect the segment and the sector within such segment on which the light impinges and to send to the control unit a signal indicating this segment and sector.

In the case of the passive system, the light transmitter 9 on the instrument unit 1 is used, this transmitter suitably being a light emitting diode. The light transmitted by the light transmitter 9 is reflected by the cubic-corner prism 11 on the target unit 2, in this case the passive unit. The prism reflects the light within a space angle of about ±3.9 rad (±25 gon), which determines the alignment requirement. In this case, the transmitter diode 9 may have a narrow lobe, providing a longer range.

Thus, the advantages afforded by the passive system are that it can be used with longer ranges and is relatively insensitive to alignment, since the transmitted and the received light beams are almost parallel with one another within a large space-angle range, where reflections of light on the target unit 2 take place on a cubic prism.

The passive and active systems may also be used simultaneously. Light emitted by the transmitter diodes 8 and 9 can be modulated at different frequencies, and the same detector 7, as illustrated in FIG. 1, can be used, since the two control signals can then be selected from the output signals of the detector. Thus, the two systems are not utilized simultaneously for steering purposes, but a comparison of both systems or discrimination of one of the systems takes place continuously. The advantage afforded by using both systems simultaneously, for detection purposes is that it can be almost assured that a correct target has been found when signals are received simultaneously from both systems. This enables reflexes from sources in the surroundings other than reflexes from the target unit 2 to be excluded.

Figure 7:
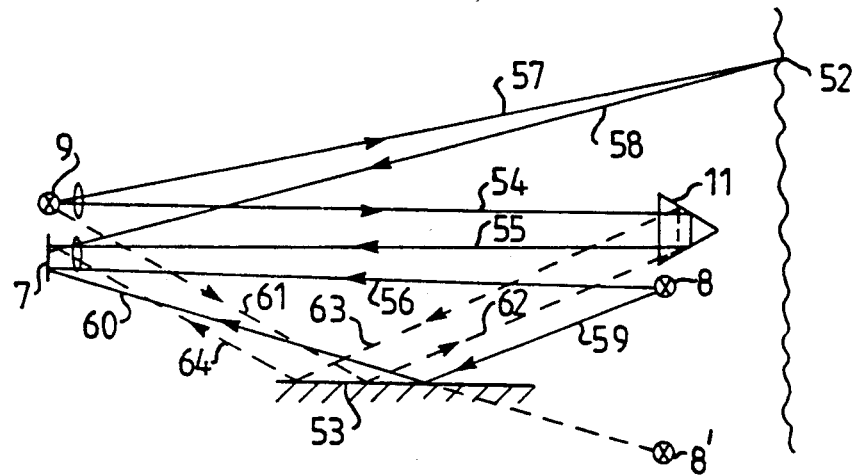
FIG. 7 is a schematic illustration of possible beam paths.

As mentioned above, both the active and the passive systems are preferably used simultaneously at least during the target seeking mode. If only one of the systems is used, there is an obvious risk that the target seeking and tracking arrangement will lock on a false target. This is illustrated schematically in FIG. 7. The light transmitter 8 and the prism 11 are situated in front of a wall having reflecting spots 52. A reflecting surface 53, such as a window, is situated beside the path way between the units 8, 11 and the light transmitter 9 and the detector 7. 54, 55 is the straight beam path 9, 11, 7. 56 is the straight beam path from the unit 8 to the detector 7.

However, if only the passive system were in charge and the active system (8) were disconnected, then the searching and tracking system could easily lock on to a false reflector 52, which is illustrated by the beam path 57, 58. If only the active system were in charge and the passive system (9, 11) were disconnected, then the searching and tracking system could easily lock on to a false reflected light transmitter 8', as illustrated by the beam path 59, 60. The risk for locking to false targets is minimized when both the active and the passive system are used simultaneously.

It is true that the passive system could also have a beam path reflected by the reflecting surface 53, as is apparent by the dashed beam path 61, 62, 63, 64, but in such a case it will be attenuated twice, i.e., be subjected to a quadrature attenuation, when reflected by the surface 53. The light beam 59, 60 from the light transmitter 8 via the reflecting surface 53 will be subjected to only one attenuation. Thus, the levels of the signals from the detector 7 are also indicated and discriminated if they are below values to be expected, or the difference in their respective signal levels exceeds a predetermined value.

Figure 8:
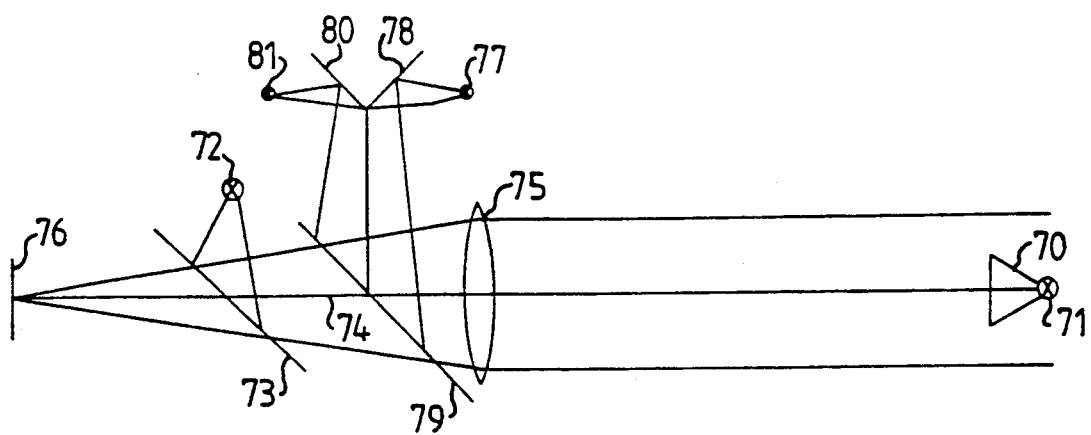
FIG. 8 is a schematic illustration of a coaxial system.

FIG. 8 illustrates schematically that the active and the passive systems can be arranged coaxially. The cube corner prism 70 provided on the target unit is provided with a light transmitter 71 at its cube corner. A semi-transparent mirror 73 placed oblique to the optical axis 74 reflects the beam from a light transmitter 72 for the passive system via a lens unit 75 to be reflected by the prism 70. The beam from the light transmitter 71 and the reflected beam from the prism 70 goes through the lens unit 75 and the semi-transparent mirror and impinges on the extended detector 76.

FIG. 8 also illustrates that the beam path for the EDM-device also be arranged coaxially with the seeking and tracking system when desired. A modulated light beam from a transmitter 77 is reflected by a mirror 78 to another mirror 79 oblique to the optical axis 74. The mirror may be a semi-transparent mirror, but if the lights from the light sources 72 and 77 have different wavelengths it could instead be a dicroic mirror. In any case, the modulation frequency of the two light sources are chosen to be quite different so that they easily could be filtered out when detected. The measuring beam is reflected by the prism 70, by the mirror 79 and another mirror 80, and then impinges on a measuring detector 81.

Figure 9:
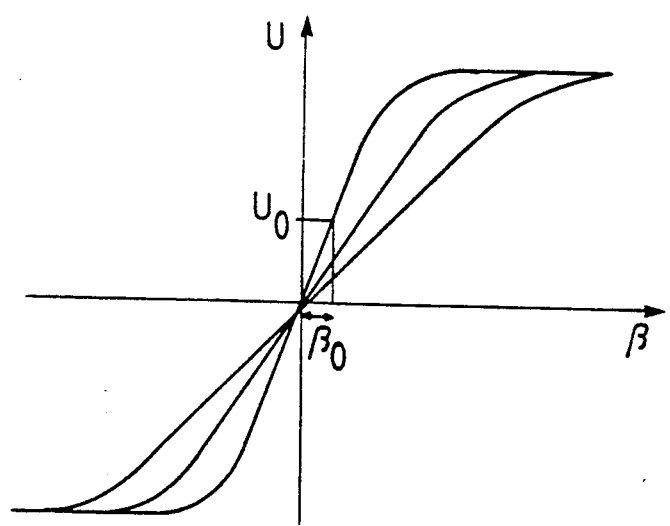
FIG. 9 is a graph of compensation values.

FIG. 9 illustrates that the direction to the target could be derived from the impingement point on the surface of the extended detector 7 or 76 even when the seeking and tracking system is not exactly directed to the target. It is not necessary to servo control the motors 3 and 4 to and fro into exact alignment, because this will stress the motors and the system. The diagram in FIG. 9 illustrates along the Y-axis different curves of the signal level U of the impinging beam in dependence of the distance to the target and the angular deviation $\beta$ from the optical axis of the detector 7 or 76 along the X-axis. The signal level of the actual impinging beam is detected and is analogue/digital converted and fed to the control and computing unit 12, which multiplicates the signal level value with a constant, which is specific to the measured distance to the target and which is taken from a table stored in a non-erasable storage within the unit 12 using the distance value or a converted form thereof as an address.

By thus determining the slope of the curve, a transformation from voltage output to corresponding angular error can be added to the actual angle value read from the angle transducers 18, 19 of the measuring station. To calibrate the slope of the detector curve (e.g., to compensate for changes with aging and temperature influence) the servo motors could be ordered to make small angular rotations which are read by the angle transducers, and the corresponding detector voltage change can be measured and the slope of the curve calculated.

The horizontal and vertical directions referred to above may be reversed.

We claim:
1. An arrangement for performing position-determining and/or setting-out work for one-man surveying, which locks a measuring station on a target unit comprising:
(a) a measuring station (1) provided with an instrument which can be rotated about a horizontal axis with the aid of a steerable vertical-angle motor (3) and about a vertical axis with the aid of a steerable horizontal-angle motor (4);
(b) a steering and computing unit (12) in said instrument having memory and being connected to said motors (3, 4);
(c) a target unit (2); and
a seeking and locating arrangement for positioning said measuring arrangement with respect to said target unit comprising:
(d) a first sighting-marker unit comprising a light source (8) placed on said target unit (2) and arranged to be directed towards said measuring station (1) and having a first light characteristic;
(e) an indicator arrangement (7) which is adapted to detect transmitted light from said first sighting-marker unit on said measuring station for detecting said first sighting-marker unit when said instrument is in alignment with said target unit; and (f) a second sighting-marker unit (8, 9, 11) comprising a light source (9) placed on said measuring station (1) and having a second light characteristic, a reflector (11) placed on said target unit (2), the light beam reflected by said reflector (11) being detectable by said indicator arrangement (7) on said measuring station;

(g) said steering and computing unit steering said motors to turn said measuring station to be directed to said target unit (2) when said indicator arrangement (7) does not detect said first and second sighting-marker units in accordance with predetermined rules, and switching into a target tracking mode with servo control directed towards said target unit when said indicator arrangement indicates said sighting-marker first and second units.

2. An arrangement according to claim 1, wherein the target seeking mode the steering and computing unit (12) is arranged to indicate the signals from both said first and said second sighting-marker units simultaneously and only to accept lock said measuring station on a target unit if signals from both said sighting-marker units are present.

3. An arrangement according to claim 1, wherein during a target-tracking sequence the steering and computing unit (12) is operative to receive signals representing the signal characters of both the first and the second sighting-marker units from the indicator arrangement and to indicate the occurrence of a difference concerning impingement-point positions of the light detector (7) of the indicator arrangements or with respect to signal strength between signals indicated by the light detector or light detectors in the indicator arrangement with respect to the two sighting-marker units, and is also operative to utilize sighting signals from the first-mentioned sighting-marker unit for continuously servo-steering the motors of the instrument for alignment with the target unit when the indicated difference exceeds a predetermined value and otherwise to utilize the sighting signal obtained from the other sighting-marker unit to effect this servo-steering function.

4. An arrangement according to claim 1, wherein in the target tracking mode the steering and computing unit (12) is arranged to indicate the signals only from said first sighting-marker unit, when said measuring station is to make a measurement to said target unit when it is set at a point to which measurement is to be made.

5. An arrangement according to claim 1, wherein each of the light detectors (7) of the indicator arrangement is divided into different segments (31-34; 35-42); and that the servo-control during said target tracking mode is arranged to be carried out so that all segments at least close to a central point will be illuminated to approximately the same extent by the light source (8; 9) of that sighting-marker unit whose sighting signal is used for alignment purposes at that moment.

6. An arrangement according to claim 5, wherein the segments are divided into sectors from within a central point and outwards; and said servo-control is effected so that the light from the light source (8, 9) of the sighting-marker unit used for alignment at that moment impinges most strongly on the sectors located closest to the central point.

7. An arrangement according to claim 1, wherein each light detector includes a SITEC-detector.

8. An arrangement according to claim 1, wherein the steering and computing unit is provided with information concerning a limited field of rotation within which the target unit shall be found, and when in the target seeking mode is operative to cause the motors of the instrument to rotate said instrument solely within said limited rotational field.

9. An arrangement according to claim 1, wherein in the absence of a signal from the sightingmarker units of the indicator arrangement on the measuring station, the steering and computing unit (12) is set to a target seeking mode in which said unit steers the motors of the instrument such as to rotate the instrument into alignment with setting-out staffs, which is indicated by indication of one of the sighting-marker units by the indicator arrangement.

10. An arrangement according to claim 1, wherein in the target seeking mode the steering and computing unit (12) is operative to cause the motors to move so rapidly as to prevent the rotating instrument from being brought to an immediate standstill when the indicator arrangement indicates a sighting-marker unit, and the steering and computing unit is operative to indicate the rotational position of the instrument at the time of indicating said sighting-marker unit, to bring the motors to a standstill and then to cause the motors to rotate the instrument back to its position of rotation in which the sighting-marker unit was indicated.

11. An arrangement according to claim 1, wherein the measuring station has a first angle meter (18) operative to measure rotation of the instrument about one of said axes; the target unit (2) has a sighting unit (21), at least one second angle meter (22) for measuring alignment of the sighting unit with the measuring station in the same direction as the first angle meter, and a transmitter unit connected to the second angle meter (22) and an activating means for transmitting the prevailing setting of the second angle meter (22) upon activation of said activating means; and the measuring station (1) has a receiver which is operative to receive signals transmitted by the transmitter unit and to calculate the angle to which the first angle meter (18) of the measuring station shall be set in order for the optical system of the measuring station to be in alignment with the sighting-marker arrangement of the target unit at any position of rotation about the second of said axes and when receiving to activate the steering and computing unit (12) to activate the steering and computing unit (12) in a manner to set the angle motor (3) of the instrument for rotation about the axis indicated by the first angle meter for rotation to the calculated direction and then to cause the angle motor (4) not associated with the first angle meter to rotate the instrument until the indicator arrangement of the measuring station indicates the sighting-marker arrangement.

12. An arrangement in accordance with claim 1, wherein in order to determine the slope of a specific detector curve regarding the exact alignment of said measuring station towards said target unit and related to the actual measured distance to the target unit, said detection curve being provided for the signal level value versus the angular deviation from the optical axis, stored constants, each being specific to a measured distance to the target unit as measured by said measuring station, are stored in a table in a non-erasable storage using the distance value or a converted form of it as an address.

13. An arrangement in accordance with claim 12, wherein in order to calibrate said slope of each said detector curve, said steering and computing unit is adapted to control said motors to make small angular rotations read by angle transducers, to provide measurement of the corresponding detector signal level change, and to calculate the slope of the detector curve for the distance in question.

* * * * *